United States Patent [19]

Kenney

[11] Patent Number: 6,144,691
[45] Date of Patent: Nov. 7, 2000

[54] METHOD AND APPARATUS FOR SYNCHRONIZING TO A DIRECT SEQUENCE SPREAD SPECTRUM SIGNAL

[75] Inventor: Thomas Kenney, San Diego, Calif.

[73] Assignee: Nokia Mobile Phones Limited, Espoo, Finland

[21] Appl. No.: 08/941,465

[22] Filed: Sep. 30, 1997

[51] Int. Cl.[7] .................................................. H04B 15/00
[52] U.S. Cl. .......................... 375/130; 375/137; 375/140; 375/142; 375/150
[58] Field of Search .................................... 375/200, 206, 375/367

[56] References Cited

U.S. PATENT DOCUMENTS

| 5,550,811 | 8/1996  | Kaku et al. ............................ 370/18 |
| 5,642,377 | 6/1997  | Chung et al. ........................ 375/200 |
| 5,644,591 | 7/1997  | Sutton .................................. 375/200 |
| 5,689,526 | 11/1997 | Slonneger et al. ................... 375/206 |
| 5,802,121 | 9/1998  | Hiramatsu ............................ 375/368 |
| 5,812,593 | 9/1998  | Kaku .................................... 375/208 |
| 5,995,537 | 11/1999 | Kondo .................................. 375/208 |

Primary Examiner—Stephen Chin
Assistant Examiner—Dac V. Ha
Attorney, Agent, or Firm—Brian T. Rivers

[57] ABSTRACT

A method for synchronization of a receiver to a direct sequence spread spectrum (DS-SS) signal in a telecommunications system. A verification process is performed in the receiver upon initial detection of a first DS-SS signal prior to attempting synchronization to a second signal. In the verification, a window search is performed in a window centered on the PN phase of the initially detected first signal. A number K of search passes are made, each on M PN offsets. At least one parameter for each of the K window search passes is saved. The at least one parameter from each pass is then processed according to a predetermined algorithm. Based on the results of the algorithm, a decision is made as to whether or not to attempt synchronization to the second signal or to restart the search.

11 Claims, 3 Drawing Sheets

METHOD AND APPARATUS FOR SYNCHRONIZING TO A DIRECT SEQUENCE SPREAD SPECTRUM SIGNAL

FIELD OF THE INVENTION

This invention relates to direct sequence spread spectrum (DS-SS) telecommunications systems. More specifically, this invention relates to an improved method and apparatus for synchronizing to a DS-SS signal.

BACKGROUND OF THE INVENTION

In the field of telecommunications, efforts have recently been directed towards developing advanced direct sequence spread spectrum (DS-SS) telecommunications systems. One example of a DS-SS type system is a Code Division Multiple Access (CDMA) type system.

In a CDMA type system multiple users, each using a channel identified by a uniquely assigned digital pseudonoise (PN) code sequence, simultaneously communicate with the system while sharing the same wideband frequency spectrum. Channel identification through the uniquely assigned digital codes is achieved by using the unique PN code sequence to spread a digital information signal that is to be transmitted. The digital information signal may be a signal, such as the output of a digitized voice circuit, having a bit rate, for example, of from 8–13 kb/s or a data signal having a higher bit rate. The PN code sequence usually has a bit rate of several orders of magnitude greater than the information signal.

During spreading the digital signal bandwidth is spread through the frequency bandwidth of the PN code sequence. Spreading is achieved by multiplying the PN code sequence and information signal together in the time domain, to generate a spread signal that has a bit rate of the PN code sequence. The spread signal is then RF modulated and transmitted on a carrier frequency that may also carry transmissions of information signals for other system users, where the other information signals have been spread by PN code sequences unique to each of the other users. The PN code sequences may be uniquely identified by having a unique phase or a unique bit sequence. In certain systems, such as a system operating according to the Telecommunications Industry Association/Electronic Industry Association (TIA/EIA) IS-95 cellular system standard, a transmission may be identified by two PN sequences. In IS-95 an individual base station is assigned a unique phase for a common system PN code sequence that spreads all forward link transmissions from base stations of that system. The unique phase identifies the base station. Each transmission from a base station is then also spread by a unique Walsh PN code sequence that identifies the particular base station channel on which the transmission is sent.

At the receiver, after carrier frequency demodulation, despreading is accomplished by generating a local replica of the transmitting user's assigned PN code(s) with a random-sequence generator in the receiver and then synchronizing the local PN code sequence(s) to the PN code sequence(s) that was superimposed on the incoming received signal in the transmitter. By removing the random sequence from the received signal and integrating it over a symbol period, a despread signal is obtained which ideally exactly represents the original digital information signal.

The process of synchronizing to a received signal is usually accomplished in two steps. The first step, called acquisition or detection, includes bringing the PN code sequences generated in the transmitter and receiver into coarse time alignment typically within one code chip interval. The second step involves fine synchronization to the signal and tracking to continuously maintain the best possible waveform alignment during reception by means of a feedback loop.

Because of the importance of synchronization many synchronization schemes have been proposed that utilize various types of detectors and decision strategies. A common feature of all synchronization schemes is that the received signal and the locally generated PN code sequence(s) are first correlated to determine the measure of similarity between the sequences. Secondly, the measure of similarity is compared to a threshold to decide if the signals are in synchronization. If there is no synchronization, the acquisition procedure provides a change in the phase of the locally generated PN code sequence and another correlation is attempted as a part of the signal search through the receiver's phase space.

The speed of signal acquisition and synchronization is generally an important performance factor in CDMA systems. For example, in an IS-95 system a mobile station must quickly search, acquire and synchronize to many different signals while maintaining communications with the system. The mobile station must initially acquire a pilot channel of the system upon power-up or entry into the system. As the mobile station moves through the system it must continually search, during ongoing communications, for stronger pilot channels of base stations located near the base station with which the mobile station is communicating. The pilot channels in IS-95 are transmitted by each base station using the same system PN code but with different offsets. The offsets allow the pilots to be distinguished from one another. All pilot channels in the IS-95 system use the Walsh code sequence of all ones to identify transmissions on the channel. The mobile station searches for pilot channels based on PN pilot channel phase information received from the system.

The mobile station must also search for phase varying multipath signals originally transmitted on a communications channel from a particular base station. Several multipath signals carrying the same information and on channels identified by the same system and Walsh PN code, but displaced in phase because of RF propagation effects, have to be searched so the strongest signals can be found and decoded. Also, during hand-offs between base stations utilizing the same carrier frequencies (soft hand-off), the mobile station must search for and acquire voice channels of target base stations while simultaneously maintaining communications on a voice channel with the current base station.

Initial acquisition or detection of a DS-SS signal may be accomplished by using the maximum likelihood acquisition method. In maximum likelihood acquisition, the received signal and the locally generated PN code sequence(s) are first correlated in the receiver to determine the measure of similarity between the signals. Secondly, the measure of similarity indicated by the correlated results is compared to a threshold to decide if the two signals are in coarse synchronization. The threshold may be determined a priori or may be an adaptive threshold, set according to the results of correlations with previous PN code phases. In the adaptive threshold method, the entire PN code space is searched and the PN code phase resulting in the maximum threshold is used to receive further communications.

In an IS-95 system, when the mobile station has detected acquisition of a pilot channel at a certain base station (or system) PN code phase, the mobile station attempts to decode a synchronization (SYNC) channel at the same PN code phase. This SYNC channel is spread by the base station PN code phase and a unique Walsh PN code sequence that identifies the SYNC channel transmissions. The SYNC channel frames transmitted on each SYNC channel from each base station are aligned with the pilot PN sequence of that base station, so correct detection and acquisition of the pilot channel allows the SYNC channel frame to be received and decoded. The SYNC channel frame includes a SYNC Channel Message that provides system parameters to the mobile station. The system parameters in the SYNC channel frame include the timing of the base station's pilot sequence with respect to the system timing and the base station's paging channel data rate. Once the mobile station has obtained information from the SYNC Channel Message, the mobile station adjusts its timing to correspond to the system's timing and begins monitoring the paging channel If the process of synchronizing to the system, which includes acquiring the pilot channel and synchronizing to the SYNC channel, involves false detections of the pilot channel, significant penalties in time may result. In IS-95, if a mobile station falsely detects a pilot channel the mobile station attempts to transition to and decode the SYNC channel. The mobile station may spend up to 1 second attempting to decode the SYNC channel, after which the process of acquisition and synchronization will start again. The time spent attempting to decode the SYNC channel after false detection of a pilot channel is significant, considering that acquisition and synchronization times in the 2-to-3 second range are typical goals for mobile station manufacturers.

False detections of a pilot channel may be reduced by using a more accurate correlation process. Increasing the accuracy of the correlation process, however, may require an increase in the correlation time that itself significantly increases the time required for synchronization.

SUMMARY OF THE INVENTION

The present invention provides an improved method and apparatus for synchronizing a receiver to a direct sequence spread spectrum (DS-SS) signal in a telecommunications system. The method and apparatus reduces the probability of false signal detections and unsuccessful synchronization attempts without requiring a more accurate PN code sequence correlation process that may require a longer correlation period.

The method and apparatus utilizes a verification process that is performed in the receiver upon initial detection of a first DS-SS signal prior to attempting synchronization to a second DS-SS signal. A window search is performed in a window centered on the PN phase of the initially detected first signal. A number K of search iterations are made through the window, each on M PN offsets. At least one parameter for each of the K window searches is saved. Then at least one parameter of the K window searches is processed according to a predetermined algorithm. Based on the results of the predetermined algorithm a verification decision is made as to whether or not to attempt synchronization to the second signal or to restart the search. Upon successful verification of the detection of the first DS-SS signal, the receiver synchronizes to the second DS-SS signal. If the verification is unsuccessful, the receiver will begin the initial search over again.

In an embodiment of the invention, the synchronization process includes verification that is performed upon acquisition (detection) of a pilot channel signal, the phase of which indicates the phase of a synchronization (SYNC) channel. If the acquisition of the pilot channel is verified, the receiver then attempts to synchronize to and decode the SYNC channel. The acquisition of the pilot channel may be determined by a correlation procedure using a maximum likelihood (MLE) detector (searcher). The searcher may use either adaptive detection threshold or a detection threshold that is determined a priori. When a pilot channel is detected, the magnitude $Y_{max,search}$ of the correlation result on the detected pilot channel, an FFT frequency bin number $b_{max,search}$ associated with $Y_{max,search}$ and the PN phase offset of the detected pilot channel $P_{search}$ are saved. During the verification process, the searcher is realigned to an offset near $P_{search}$. A number K of window searches centered about $P_{search}$ are then performed, where each window search involves searching a number M of consecutive PN offsets. In each window search a number $N_s$ of subcorrelation values are collected for each of the M PN offsets. An $N_s$ point FFT is computed for each PN offset and a maximum magnitude vector for the FFT output vector is determined. A maximum magnitude vector $Y_{max,x}$ out of all PN offsets for each window search X is stored along with its corresponding FFT frequency bin number $b_{max,x}$ and PN offset, $P_{max,x}$.

The maximum magnitude vectors are then used in a verification process. The number J1 of window searches in which the maximum magnitude vector $Y_{max,x}$ is greater than the magnitude of the detected PN offset $Y_{max,search}$ scaled by a scaling threshold is determined. If J1 is greater than the total number of window searches K divided by 2, the verification process is continued. Otherwise a false detection is declared and the pilot search is restarted. If the verification is continued, the J1 values determined in the first step are tested in the frequency domain. The FFT bin number $b_{max,x}$ for each of the J1 values is tested to determine if it is within ±1 frequency bin of the initial search bin $b_{max,search}$. A value J2 is then determined where J2 is the number of $b_{max,x}$ within ±1 bin of $b_{max,search}$. If J2>J1 divided by 2 the verification process is continued. Otherwise, a false detection is declared and the pilot search is restarted. If the verification is continued, the magnitudes having $b_{max,x}$ determined to be within ±1 bin of the search bin in the second step are tested in the time domain. The PN offsets $p_{max,x}$ of each of the J2 magnitudes within ±1 bin of the search bin are tested to determine if a majority of the PN offsets are within ±2 chips of each other. If a majority of the PN offsets $p_{max,x}$ are within ±2 chips of each other, verification is complete and the receiver attempts to synchronize to and decode the SYNC channel. Otherwise a false detection is declared and the pilot search is restarted.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
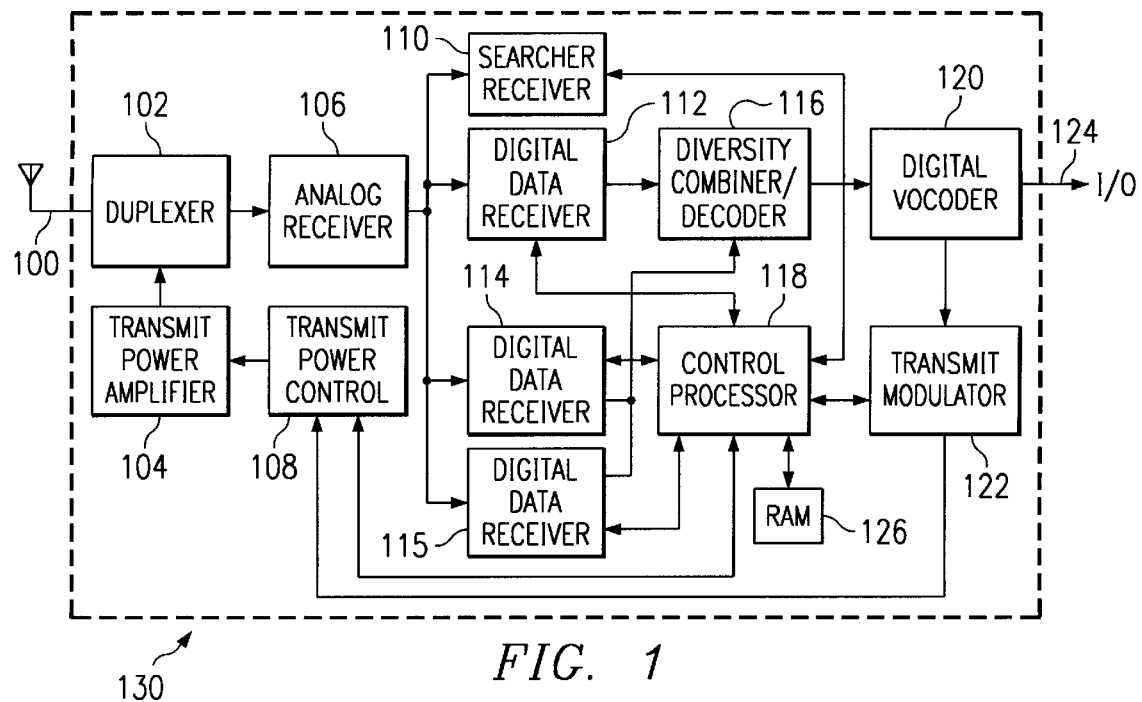
FIG. 1 is a block diagram of a CDMA receiver constructed according to an embodiment of the invention.

Referring now to FIG. 1 therein is a block diagram showing portions of a mobile station 130 constructed according to an embodiment of the invention. Mobile station 130 comprises an antenna 100, duplexer 102, transmit power amplifier 104, analog receiver 106, transmit power controller 108, searcher/receiver 110, a first digital data receiver 112, a second digital data receiver 114, a third digital data receiver, diversity combiner/decoder 116, control processor 118, RAM 126, user digital vocoder 120, transmit modulator 122 and user interface 124. Mobile station 130 may operate according to the Telecommunications Industry Association/Electronic Industry Association (TIA/EIA) IS-95 standard or in accordance with The American National Standards Institute (ANSI) 008 standard for code division multiple access (CDMA) cellular systems. Alternatively, mobile station 130 could operate according to other CDMA system standards. In general, the invention has applicability to all types of DS-SS systems in which PN sequences are used to spread signal channels.

Antenna 100 is coupled to analog receiver 106 through duplexer 102. Signals received at antenna 100 are input to analog receiver 106 through duplexer 102. The received signals are converted to an IF frequency and then filtered and digitized in analog receiver 106 for input to the digital data receiver 112, digital data receiver 114 and searcher/receiver 110. The digitized IF signal input to digital data receiver 112, digital data receiver 114 and searcher/receiver 110 may include signals from many ongoing calls, together with the pilot carriers transmitted by the base station of the cell site in which the mobile station is currently located, plus the pilot carriers transmitted by the base stations in all neighboring cell sites. Digital data receiver 112, digital data receiver 114, and digital data receiver 115 perform a correlation on the IF signal with a PN sequence of a desired received signal. The output of digital data receivers 112, 114 and 115 is a sequence of encoded data signals from three independent paths.

Searcher/receiver 110 searches the pilot channel PN phase offset space for pilot channel signals transmitted from a base station. Searcher/receiver 110 is also used to search for other signals transmitted from different base stations (not shown), according to the invention. Searcher/receiver 110 generates correlation results for a desired waveform and generates signals to control processor 118 indicating the correlation results of the searched signals.

The encoded data signals output from digital data receivers 112, 114 and 115 are input to diversity combiner/decoder 116. In diversity combiner/decoder 116 the encoded data signals are aligned and combined, the resultant data signal is then decoded using error correction, and is then input to digital vocoder 120. Digital vocoder 120 outputs information signals to the user interface 124. The user interface 124 may be a handset with a keypad or another type of user interface, such as a laptop computer monitor and keyboard.

For transmission of signals from mobile station 130, a signal received at user interface 124 is input to user digital vocoder 120 in digital form, as for example, data or voice that has been converted to digital form at user interface 124. In digital vocoder 120 the signal is encoded and output to transmit modulator 122. Transmit modulator 122 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 130 from the telecommunications system and transferred to control processor 118 from digital data receivers 112 and 114. Control processor 118 sends the PN carrier information to transmit modulator 122. A PN modulated signal is output from transmit modulator 122 to transmit power control 108. Transmit power control 108 sets the level of the transmission power of mobile station 130 according to commands received from control processor 118. The power control commands may be generated by control processor 118 according to commands received from the system, or may be generated by software of control processor 118, according to predetermined criteria, in response to data received from the system through digital data receivers 112, 114 and 115. The modulated signal is then output from transmit power control 108 to transmit power amplifier 104 where the signal is amplified and converted to an RF carrier frequency signal. The RF carrier frequency signal is then output from power amplifier 104 to duplexer 102 and transmitted from antenna 100 to the base station (not shown).

Figure 2:
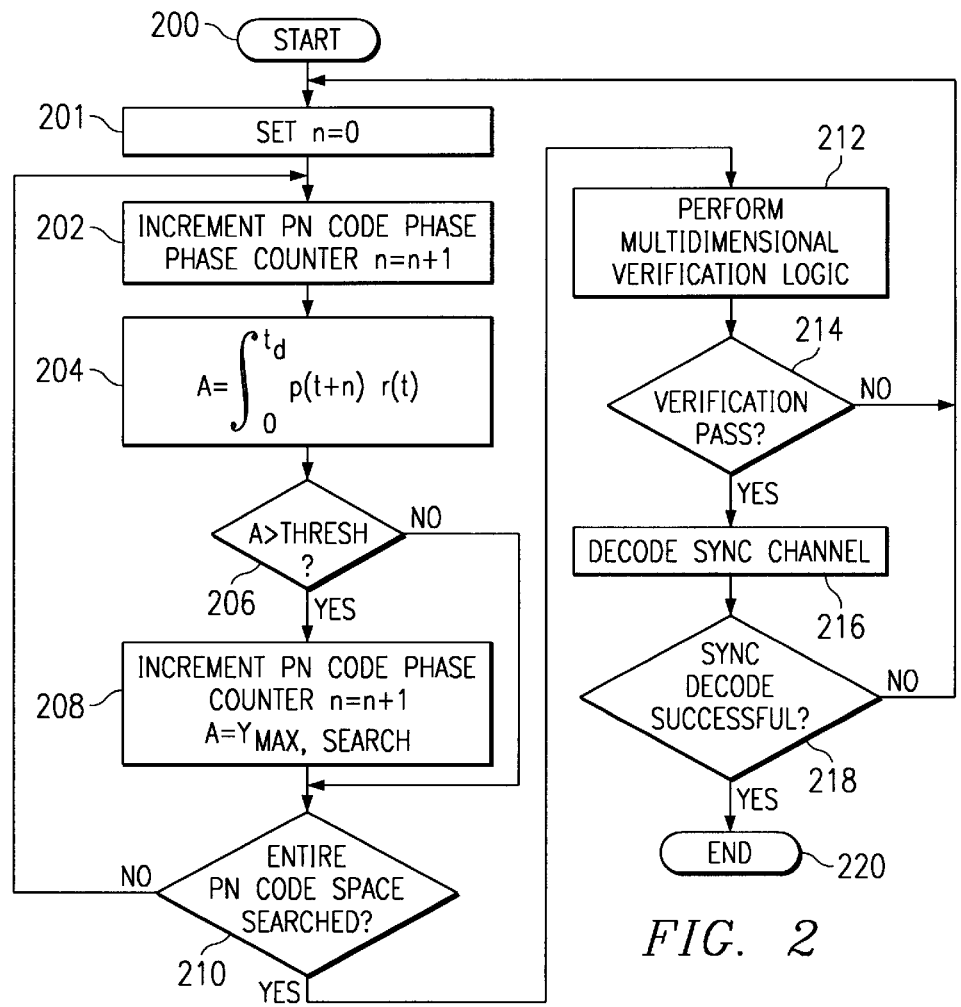
FIG. 2 is a flow diagram illustrating process steps performed in the synchronization process according to an embodiment of the invention.

Referring now to FIG. 2, therein is a flow diagram illustrating process steps performed in the synchronization process according to an embodiment of the invention. The process steps of FIG. 2 are performed within searcher/receiver 110, digital data receivers 112, 114, and 115, and/or control processor 118. Control processor 118 generates control signals to searcher/receiver 110 and digital data receivers 112, 114 and 115, according to process control software code. The software code for controlling the process and parameters generated and used by control processor 118 may be stored in RAM 126 or within other memory devices (not shown) included within control processor 118, searcher/receiver 110 or digital data receivers 112, 114 and 115. One skilled in the art will realize that the functions performed in the steps of FIG. 2 may be implemented within mobile station 130 in hardware or software or various combinations of hardware and software.

The process starts at step 200. At step 201 the process PN code phase counter index n, used in the process to keep track of the number of PN code phases that have been searched, is initialized to zero. Next, at step 202, n is set to one for the first PN code phase search. At step 204, correlation is performed in searcher/receiver 110 over an integral of td seconds on a received signal and on an internally generated pilot channel PN code sequence. The pilot channel phases searched are according to data received from the system.

Beginning with the transfer of the received signal from analog receiver 106 to the searcher/receiver 110, the received signal samples are correlated using a PN code sequence at the phase being searched, with the resulting correlated signal being divided into $N_s$ sub-dwells, each sub-dwell integrated over a sub-dwell time ($T_s$) and passed through a square-law envelope detector. The $N_s$ complex correlation values are computed according to equation (1):

$$R_n^{(p)} = \sum_{m=0}^{N_c-1} r(n - pN_c + m + t_o) \cdot a^*(n - pN_c + m) \quad (1)$$

$$p = 1, 2, \ldots, N_s$$

where n is the relative PN code phase position;
$N_c$ is the number of chips in the sub-dwell correlation;
p is the sub-dwell correlation index;
$N_s$ is the number of sub-dwells;
$t_o$ is some real valued initial time offset; and
$R_n$, r, and a* are all complex values.

The length of the correlation vector $R_k$ is evaluated to determine if it is a power of two, i.e., if vector length $L=2^n$. (For example, L could be 4, 8, 16, . . . , 64, etc.) If $L \neq 2^n$, it should be augmented with zeroes, i.e., "zero padded", as shown in equation (2) to make final vector L a power of two:

$$\bar{R}_n = [R_n^{(0)}\ R_n^{(1)}\ R_n^{(2)}\ \ldots\ R_n^{(N-1)}\ 0\ 0\ \ldots\ 0] \quad (2)$$

For description purposes, it will be assumed that there are L sub-dwell values available so that zero padding is not required, i.e., $N_s = L$.

The L sub-dwell integration values are transferred to signal processor 118 where an L-point DFT (discrete Fourier transform) is computed using the FFT algorithm to provide L discrete samples (frequency bins) within the frequency spectrum.

$$Y_n(k) = \sum_{l=0}^{L-1} R_n^{(l)} \cdot w(kT_s) \cdot e^{-j\pi\frac{kl}{L}T_s} \quad k = 0, 1, \ldots, K-1 \quad (3)$$

where $T_s$ is the sub-dwell sampling rate; and w is the corresponding window function, which is rectangular. K may be as small as 8 or 16; however, as is known, the larger the FFT, the better the performance. The centers of the bins are located at $x\ (f_s/N)$, where x is an integer ($-L/2 \geq x \geq L/2$). Given the above assumption that L is a power of two and zero padding is not being used, equation (3) can be expressed as:

$$Y_n(k) = \sum_{l=0}^{N_s-1} \left\{ \sum_{m=0}^{N_c-1} r(n - kpN_c + m + l) \cdot a^*(n - pN_c + m) \right\} \cdot \quad (4)$$

$$w(k) \cdot e^{-j\pi kl/N_s} \quad k = 0, 1 \ldots, K-1$$

The magnitude of each of the L bins is computed by:

$$Z_n(k) = |Y_n(k)| \quad (5)$$

and processed through a corresponding one of L digital filters in a bank to determine the maximum magnitude:

$$[A = \max\{Z_n(k)\}] \quad (6)$$

An infinite impulse response (IIR) filter or a finite impulse response filter (FIR), both of which are known in the art, may be used for this purpose. (See, e.g., Marven and Ewers, *A Simple Approach to Digital Signal Processing*, 1996, Wiley Interscience, New York).

At the end of the correlation interval td, the magnitude of the output of the correlator A is compared to the detection threshold at step 206. The threshold A may be set to an initial predetermined value. If the magnitude of the correlation output exceeds the threshold, the process moves to step 208. At step 208 PN code phase counter n is incremented, the threshold is set to the magnitude of the correlation output A. The PN code phase magnitude $Y_{max,search}$ is set to the value A, and the corresponding frequency bin index $B_{bmax,search}$ and PN phase $P_{search}$ are also set to the values associated with the magnitude of the correlation output. From step 208 the process moves to step 210. If, however, at step 206 it is found that the magnitude of the correlation output does not exceed the threshold, the process moves to step 210. In the embodiment of FIG. 2 the threshold is adjusted adaptively, and every time the threshold is exceeded, it is increased to the value that exceeded the threshold.

At step 210 it is determined whether the entire PN code phase space has been searched. If the entire PN code phase has not been searched, the process moves back to step 202 where the PN code phase counter is incremented and steps 204, 206 and/or 208, and 210 are repeated for the next PN code phase. This repetition continues until the entire PN code space is searched. If, however, at step 210 it is determined that the entire PN code phase space has been searched, the process moves to step 212. At step 212 multidimensional verification is performed on the PN code phase having the correlation output magnitude which was last used to set threshold A at step 208, i.e., the PN code phase in the search space having the maximum magnitude for the correlation result at step 204. This PN code phase is the PN code phase of the detected pilot channel.

Figure 3A:
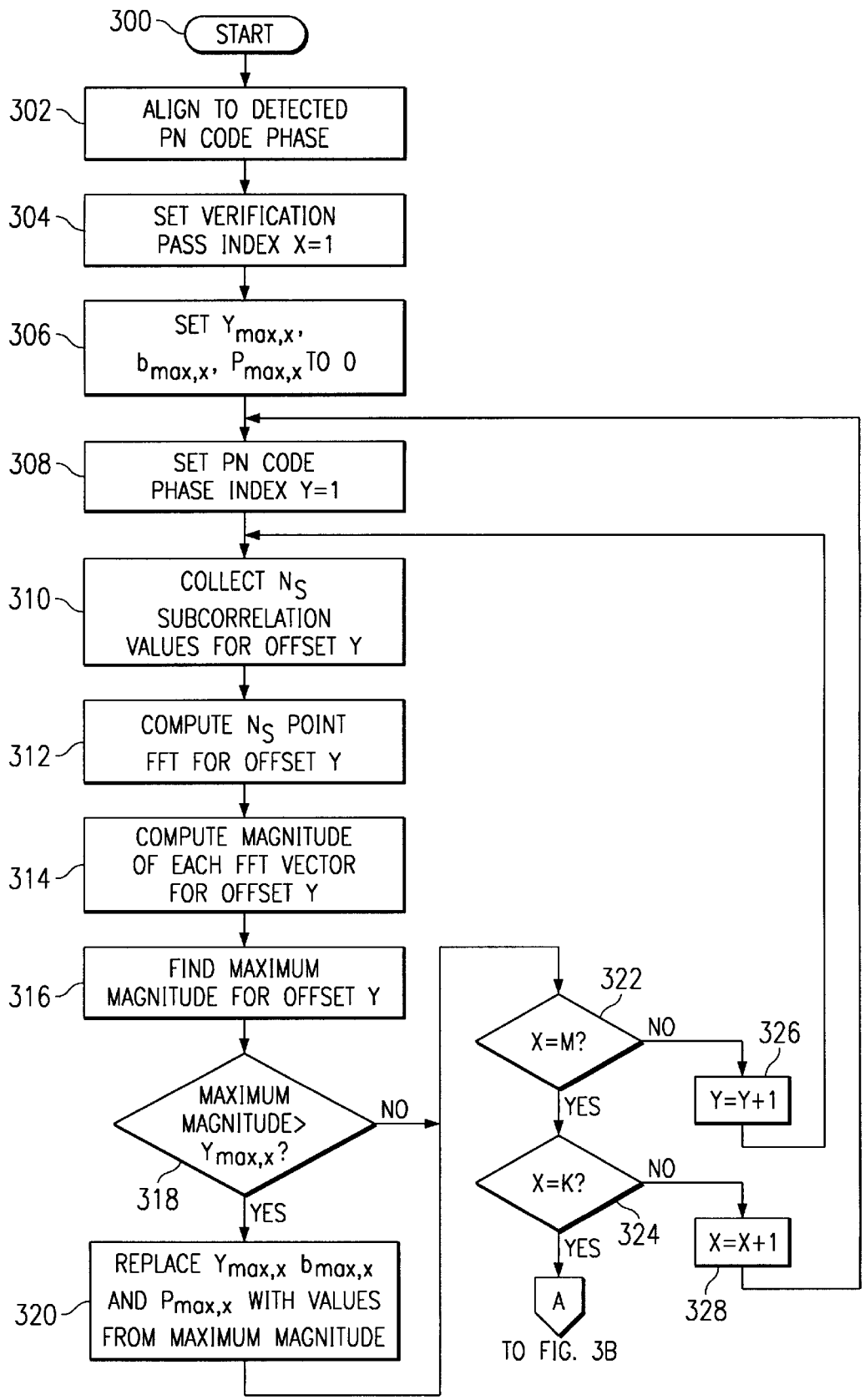
FIGS. 3A and 3B are flow diagrams illustrating process steps performed in verification step 212 of the flow diagram of FIG. 2.
Figure 3B:
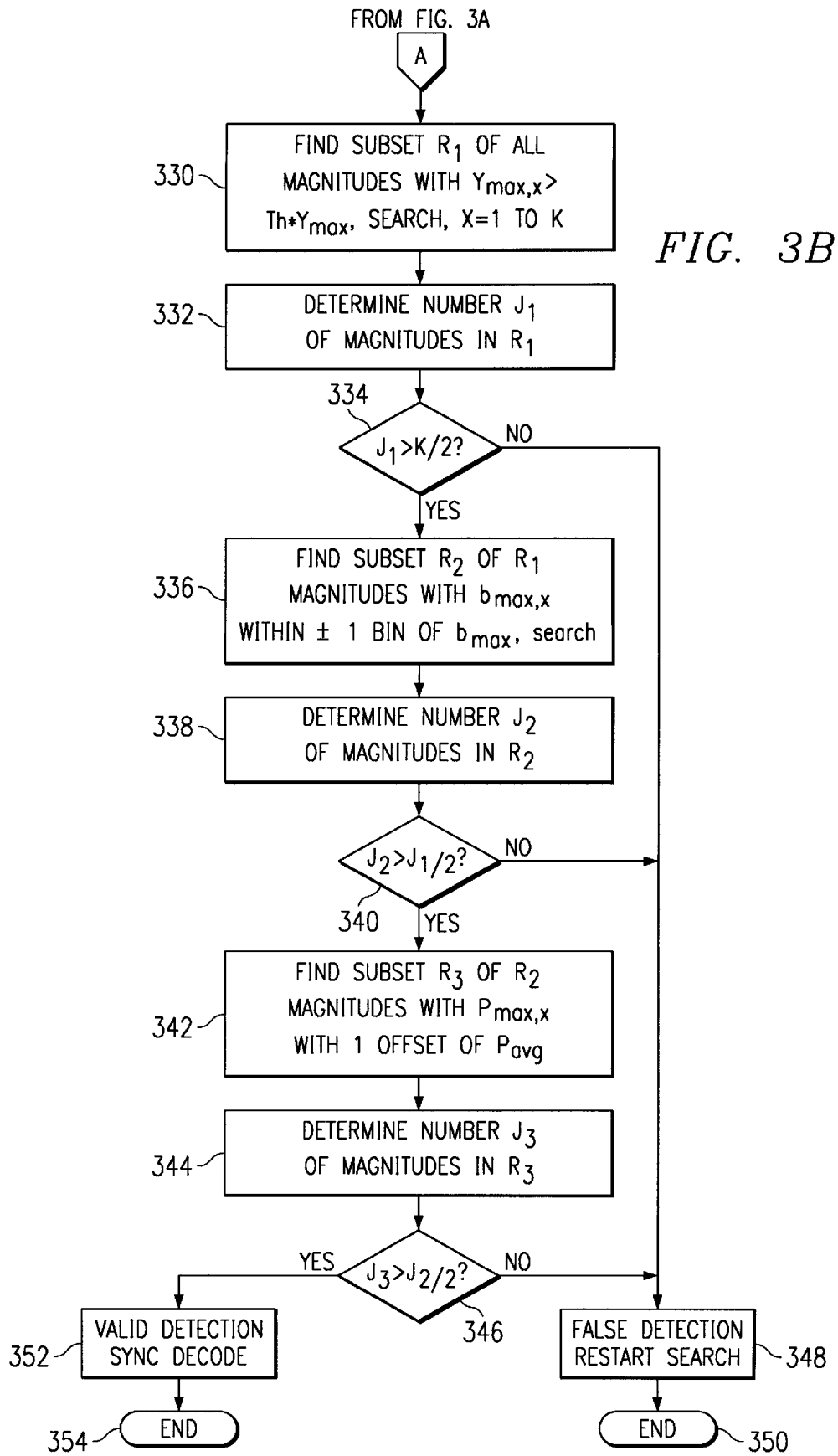

Referring now to FIGS. 3A and 3B, therein are illustrated process steps performed in verification step 212 of the flow diagram of FIG. 2. The verification process begins at step 300. At step 302 searcher/receiver 110 is aligned to the PN code phase of the detected pilot channel. At step 304 verification pass index x is set to one. In the verification a total of K passes are made through the search window with each pass including M PN offsets. M may be set so the $M \ll C_n$, where $C_n$ is the length of the PN code. For example, in an IS-95 system the PN code length equals 32768 chips, M may be set from 11 to 65. At step 306 the values $Y_{max,x}$, $b_{max,x}$, and $P_{max,x}$ are initialized to zero. $Y_{max,x}$ is used to indicate a maximum magnitude subcorrelation result for verification pass x, parameter $b_{max,x}$ indicates a frequency bin number corresponding to $Y_{max,x}$, and $P_{max,x}$ indicates the corresponding PN offset at which $Y_{max,x}$ was found.

Next, at step 308, PN code phase index y is set to one. PN code phase index y is used to track the M individual PN code phases searched in each of the windows passes x. At step 310 Ns subcorrelation values are calculated for PN code phase y. In the embodiment of the invention, Ns may be set equal to L/Nc, where L is the total integration length (in chips) for each PN code phase, and Nc is the number of chips in the subcorrelation period. Next, at step 312, an Ns point FFT is computed from the Ns subcorrelation results. This is done in the manner shown in equations 1–4. A magnitude for each of the Ns elements within the FFT output vector is then calculated at step 314 as in equation 5. At step 316 the maximum magnitude $Y_{max,y}$ of all elements for the FFT output vector for PN code phase y is determined as in equation 6 with max $(Y_n(k)) = Y_{max,y}$.

at step 318, a determination is made as to whether $Y_{max,y}$ is greater than the current value of $Y_{max,x}$. If it is determined that $Y_{max,y}$ is greater than $Y_{max,x}$ the process moves to step 320. At step 320 the current vector $Y_{max,x}$ is replaced with $Y_{max,y}$, and the current vectors $b_{max,x}$ and $P_{max,x}$ are replaced with $b_{max,y}$ and $P_{max,y}$, respectively. After the vectors are replaced, the process moves to step 322. If however, at step 318, it is determined that the $Y_{max,y}$ is not greater than the current value of $Y_{max,x}$, the process moves to step 322 without performing step 320.

At step 322 a determination is made as to whether PN code phase index y is equal to the total number of phases to be searched M, i.e., it is determined if the complete window has been searched. If y is not equal to M, the process moves to step 326 where y is incremented. From step 326 the process moves to step 310. Steps 310 to 320 are then repeated for the incremented value of y. The process will be repeated until all of the M PN code phases to be searched in the window x are searched. When M PN code phases have been searched, a determination will be made at step 322 that y equals M, and the process will move to step 324.

At step 324 a determination is made as to whether the verification pass index x is equal to the number of window search iterations K, i.e., it is determined if the desired number of trials has been completed. If x is not equal to K, the process moves to step 328 where x is incremented. From step 328 the process moves to step 308. Steps 308 to 322 and step 326 are then repeated for the incremented value of x.

The process will be repeated until all of the K window search iterations are performed. When K window search iterations are performed, a determination will be made at step 324 that x equals K, and the process will move to step 330 of FIG. 3B.

At step 330 the subset R1, where R1 contains all $Y_{max,x}$, greater than $Th*Y_{max,search}$, for x=1 to K, is determined. $Y_{max,search}$ is the magnitude for the detected pilot signal. The value Th is a scaling threshold that in the embodiment may be set to 0.5 (half power). Next, at step 332, the number J1 of magnitudes in R1 is determined. At step 334 a determination as to whether J1 is greater than K/2 is made. If it is determined that J1 is not greater than K/2, the process moves to step 348. At step 348 the process initiates restart of the search. At step 350, the verification process shown in FIGS. 3A and 3B ends. The process flow then returns to FIG. 2 and the process moves to step 202 as the search process is started again.

If however, at step 334, it is determined that J1 is greater than K/2, the process moves to step 336. At step 336 the subset R2, where R2 contains all $b_{max,x}$, from the subset of frequency bin numbers associated with the magnitudes in R1, having a bin number within plus or minus one bin number of $b_{max,search}$, is determined. $B_{max,search}$ is the frequency bin number associated with $Y_{max,search}$. Next, at step 338 the number J2 of magnitudes in R2 is determined. At step 340 a determination is made as to whether J2 is greater than J1 divided by 2. If it is determined that J2 is not greater than J1 divided by 2, the process moves to step 348. At step 348 the process initiates restart of the search. At step 352 the verification process shown in FIGS. 3A and 3B ends. The process flow then returns to FIG. 2 and the process moves to step 202 as the second process is started again.

If, however, at step 340 a determination is made that J2 is greater than J1 divided by 2, the process moves to step 342. At step 342 the subset R3, where R3 contains all $P_{max,x}$, from the subset of offsets associated with the magnitudes in R2, having an offset within ±1 offset of $P_{avg}$ for the subset $R_2$ is determined. $P_{avg}$ for the subset $R_2$ may be calculated as $$P_{avg} = \frac{1}{J2} \sum_{m=0}^{\epsilon R_2} P(m) \qquad (7)$$

Next, at step 344, the number J3 of magnitudes in the subset R3 is determined. At step 346 a determination is made as to whether J3 is greater than J2 divided by 2. If it is determined that J3 is not greater than J2 divided by 2, the process moves to step 348. At step 348 the process initiates restart of the search. At step 350 the verification process of step 212 ends. The process flow then returns to FIG. 2 and the process moves to step 202 as the search process is started again.

If, however, at step 346 a determination is made that J3 is greater than J2 divided by 2, the detection of the pilot channel is considered valid and the process moves to step 352. At step 352 the process initiates the SYNC channel decode. At step 354 the verification process of step 212 ends. The process flow then returns to FIG. 2 and the process moves to step 216. MS 130 performs SYNC channel decode at digital data receivers 112, 114 and 115.

Referring again to FIG. 2, at step 218 a determination is made as to whether the SYNC channel decode has been successful. If the SYNC channel decode was successful, the process moves to step 220 and ends. Mobile station 130 will now use the information received from the SYNC channel to access the system. If, however, at step 218 a determination is made that the SYNC channel decode was not successful, the process will return to step 201 and the search process is started over again. Mobile station 130 may go through the process and restart the search whenever the search has been unsuccessful with no limit to the number of restarts at step 201, until detection is successful and a SYNC channel is decoded. Alternatively, a timer may be used to stop the search after a certain predetermined period of time or number of iterations through FIG. 2 if the search has been unsuccessful throughout that predetermined time period or number of iterations. The timer may then restart the search process of FIG. 2 after a predetermined down time.

Although described in the context of particular embodiments, it should be realized that a number of modifications to these teachings may occur to one skilled in the art. By example, each of the three different checks on $Y_{max,x}$, $b_{max}$, or $P_{max,x}$ could be performed separately, as a verification process. Thus, while the invention has been particularly shown and described with respect to preferred embodiments thereof, it will be understood by those skilled in the art that changes in form and scope may be made therein without departing from the scope and spirit of invention.

What is claimed is:

1. A method for synchronizing a receiver to a direct sequence spread spectrum (DS-SS) signal, said method comprising the steps of:

receiving a first signal and correlating said first signal with at least one PN code sequence at a search PN code phase offset to generate a detection magnitude;

determining that said detection magnitude indicates a detection of said first signal;

performing a plurality of window searches and generating a first plurality of selected window magnitudes, each of said plurality of window searches performed on a plurality of verification PN code phase offsets substantially centered on said search PN code phase offset; and determining a second plurality of selected window magnitudes from said first plurality of selected window magnitudes, wherein all selected window magnitudes in said second plurality of selected window magnitudes are within a predetermined range of said detection magnitude; and determining whether a selected number of window magnitudes within said second plurality of selected window magnitudes is greater than a predetermined value;

and, if it is determined that a selected number of window magnitudes within said second plurality of selected window magnitudes is greater than a predetermined value;

receiving and decoding a second signal.

2. The method of claim 1, wherein each window search in said step of performing a plurality of window searches and generating a first plurality of selected window magnitudes comprises the steps of:

(a) collecting a plurality of N subcorrelation values for one of a plurality of verification PN code phase offsets;

(b) computing an N point FFT from each of said plurality of N subcorrelation values;

(c) computing a plurality of subcorrelation magnitudes, each of said plurality of subcorrelation magnitudes computed from an element in the output vector of said FFT;

(d) determining a selected offset magnitude for said one of a plurality of verification PN code phase offsets from said plurality of subcorrelation magnitudes;

(e) determining if said selected offset magnitude is greater than a selected window magnitude;

(f) saving, in response to a positive determination in step e, said selected offset magnitude as said selected window magnitude; and (g) repeating steps a, b, c, d, e and f, for all of said plurality of verification PN code phase offsets in the window search to generate a plurality of selected window magnitudes.

3. The method of claim 1, wherein step of receiving a first signal and correlating said first signal further comprises generating a detection frequency bin for said detection magnitude, and said step of determining a second plurality of selected window magnitudes further comprises generating a plurality of selected frequency bins, one for each of said second plurality of selected window magnitudes.

4. The method of claim 3, wherein said step of determining whether a selected number of window magnitudes within said second plurality of selected window magnitudes is greater than a predetermined value comprises the steps of:

determining a subset of selected frequency bins from said plurality of selected frequency bins wherein all frequency bins in said subset are within a predetermined range of said detection frequency bin; and determining that the number of selected frequency bins in said subset is greater than a predetermined value.

5. The method of claim 1, wherein step of receiving a first signal and correlating said first signal further comprises generating a detection PN offset for said detection magnitude, and said step of determining a second plurality of selected window magnitudes comprises generating a plurality of selected PN offsets, one for each of said second plurality of selected window magnitudes.

6. The method of claim 5, wherein said step of determining whether a selected number of window magnitudes within said second plurality of selected window magnitudes is greater than a predetermined value comprises the steps of:

determining a subset of selected PN offsets from said plurality of selected PN offsets, wherein all PN offsets in said subset are within a predetermined range of said detection PN offset; and determining whether the number of selected PN offsets in said subset is greater than a predetermined value.

7. An apparatus for synchronizing a receiver to a direct sequence spread spectrum (DS-SS) signal, said apparatus comprising:

an analog receiver for receiving a plurality of DS-SS signals;

a searcher, coupled to said analog receiver, said searcher for receiving a first control signal and correlating a first DS-SS signal of said plurality of DS-SS signals with at least one PN code sequence at a search PN code phase offset to generate a detection magnitude, wherein said correlating of said first signal is performed according to said first at least one control signal;

a control processor, coupled to said searcher, said control processor for generating said first at least one control signal and controlling said correlation of said first DS-SS signal in said searcher, said control processor further for determining that said detection magnitude indicates a detection of said first DS-SS signal, performing a plurality of window searches and generating a first plurality of selected window magnitudes from said plurality of window searches, each of said plurality of window searches being performed on a plurality of verification PN code phase offsets and substantially centered on said search PN phase offset, determining a second plurality of selected window magnitudes from said first plurality of selected window magnitudes, wherein all selected window magnitudes in said second plurality of selected window magnitudes are within a predetermined range of said detection magnitude, and determining whether a selected number of window magnitudes within said second plurality of selected window magnitudes is greater than a predetermined number, and, in response to an indication that a selected number of window magnitudes within said second plurality of selected window magnitudes is greater than a predetermined number, generating a second at least one control signal; and a digital data receiver, coupled to said control processor and said analog receiver, said digital data receiver for receiving said second at least one control signal and, in response to receiving said second at least one control signal, decoding a second DS-SS signal of said plurality of DS-SS signals.

8. The apparatus of claim 7, wherein said processor further generates a detection frequency bin for said detection magnitude, and generates a plurality of selected frequency bins from said second plurality of selected window searches, each of said selected frequency bins corresponding to one of said second plurality of selected window magnitudes.

9. The apparatus of claim 8, wherein said control processor determines whether a selected number of window magnitudes within said second plurality of selected window magnitudes is greater than a predetermined number by determining a subset of selected frequency bins from said plurality of selected frequency bins, wherein all selected frequency bins in said subset are within a predetermined range of said detection frequency bin, and by determining whether the number of selected frequency bins within said subset of selected frequency bins is greater than a predetermined value.

10. The apparatus of claim 7, wherein said processor generates a detection PN offset for said detection magnitude, and further generates a plurality of selected PN offsets from said second plurality of window searches, each of said second plurality of selected PN offsets corresponding to one of said second plurality of selected window magnitudes.

11. The apparatus of claim 10, wherein said control processor determines whether a selected number of window magnitudes within said second plurality of selected window magnitudes is greater than a predetermined number by determining a subset of selected PN offsets from said second plurality of selected PN offsets, wherein all selected PN offsets in said subset are within a predetermined range of said detection offset, and by determining whether the number of selected PN offsets within said subset of selected PN offsets is greater than a predetermined value.

\* \* \* \* \*